United States Patent Office 3,460,926
Patented Aug. 12, 1969

3,460,926
HIGH SILICA CONTENT GLASSES
Edward A. Weaver, Toledo, Ohio, assignor to Owens-Illinois, Inc., a corporation of Ohio
No Drawing. Continuation-in-part of application Ser. No. 514,391, Dec. 16, 1965. This application July 17, 1967, Ser. No. 653,642
Int. Cl. C03b 19/06
U.S. Cl. 65—18    2 Claims

ABSTRACT OF THE DISCLOSURE

In accordance with this invention there is prepared a high silica content glass of improved physical and chemical properties and characteristics, especially improved chemical inertness and thermal shock resistance, by compressing and sintering, preferably under vacuum, a glass-forming mixture containing at least 90 percent by weight highly-pure, vitreous silica previously prepared by a vapor phase decomposition process utilizing sulfur-containing organic fuels.

RELATED APPLICATIONS

This application is a continuation in part of copending U.S. patent application Ser. No. 514,391, filed Dec. 16, 1965 now abandoned.

THE INVENTION

This invention relates to the preparation of high silica content glasses and articles made therefrom.

More particularly, this invention relates to the preparation of high silica content glasses from a glass-forming mixture containing at least 90 percent by weight, finely-divided, highly pure, vitreous silica previously prepared by a vapor phase decomposition process utilizing sulfur containing organic fuels, particularly organic fuels wherein there is a carbon-sulfur linkage.

There are many known processes for preparing finely-divided metal or metalloid oxides. Basically the types of processes include the so-called acid precipitation (or sulfate) process and the vapor phase decomposition process. Among the latter there are several sub-processes including the vapor phase oxidation and the vapor phase hydrolysis of a metal halide.

Although many of the vapor phase decomposition reactions converting metal halide to metal oxide are exothermic, e.g. the oxidation of $TiCl_4$ to $TiO_2$, the processes typically require a continuous supply of heat due to thermal losses which inherently accrue, particularly in the withdrawal of the oxide and effluent gases from the reaction zone.

In the prior art, heat has been continuously supplied by means of indirect or direct preheating of one or more reactants. Direct heating has included plasma arc and/or fuel combustion externally or internally of the reaction zone. Fuel combustion has in turn included a wide assortment of fuels including both carboneous and sulfur containing fuels.

In the practice of this invention it has been discovered that high silica glasses of substantially improved physical and chemical characteristics can be prepared from silica prepared by a vapor phase decomposition process utilizing a combustible sulfur-containing organic fuel which is burned either externally or internally of the reaction zone.

In the preferred practice of this invention it has been found that highly suitable results are obtained with finely-divided silica prepared by the Best and Hughes process as disclosed in the copending application of William V. Best and Roland L. Hughes, Ser. No. 514,314 filed concurrently with the parent application hereof, and assigned to the same assignee as the present invention. In such copending application there is disclosed and claimed (both method and composition features) an invention relating to the production of oxides in a finely-divided state. More particularly the oxides of the Best et al. application are oxides of metals and metalloids including, for example, finely-divided oxides of silicon, titanium, germanium, aluminum and boron which are produced by direct oxidation in a flame, with the aid of a particular fuel, at least one perhalide (e.g., two, three, or any desired higher number of perhalides) selected from the group consisting of volatile (volatizable) perhalides of metals and metalloids.

Thus the preferred embodiment of the instant invention is concerned with the production of shaped articles utilizing a metalloid oxide, specifically crude and/or calcined silica, that has been produced as described and/or claimed in the aforesaid Best et al. application, and which by this cross-reference is made a part of the disclosure of the instant application. In making the shaped articles the silica may be modified by the addition of a minor amount or amounts of modifying component(s), specifically inorganic oxide(s).

There are many uses in domestic and industrial applications for shaped inorganic bodies or articles where improved chemical inertness and increased thermal shock resistance are required. Examples of such applications are the fabrication of radomes; the production of spark-plug electrically insulating bodies; and the manufacture of laboratory apparatus such as crucibles, tubing, vessels, etc., where transparency is not required. Many of such articles are now made of sintered or fused silica because of its chemical inertness and high thermal resistance.

There has long been need for means of simplifying the technique for producing shaped silica articles of the kind described in the preceding paragraph. For example, silica radomes are presently made by slip casting as described in, for instance, the September 1964, issue of "Ceramic Industry." The fired radomes are quite porous and must be sealed either by the application of a high-temperature-resistant coating such as polytetrafluoroethylene; or the surface must be fused by the heat of an oxy-acetylene flame.

In the preferred embodiment hereof, finely-divided silica of the kind that has been produced as described in the aforementioned Best et al. application is eminently suitable for the production of articles of manufacture comprised of a shaped, solid, sintered mass of sinterable, particulate material comprised mainly, or consisting essentially, of silica particles. Such finely-divided silica will hereafter often be referred to, for purpose of brevity, as $CS_2$-Sil.

By "sintered" product, article, mass or the like as used herein and in the appended claims, it is generally meant that the specified silica particles (alone or admixed with a modifying inorganic component) of which the product is made have been united to form a solid mass in which the said particles have lost their particulate form. It is intended to include (unless a different or more specific meaning is clear from the context) both solid masses wherein the particles are united together mainly by surface-melting or fusion of the individual components to form a coalesced mass, as well as those solid masses wherein the individual particles have melted sufficiently so that a vitreous mass is obtained. Also, by "sintering" temperature, point, temperature range or the like, as employed herein and in the appended claims, is meant that temperature or temperature range necessary to obtain the aforementioned "sintered" product or article.

The use of CS$_2$-Sil in the manufacture of shaped articles having a high silica content makes it possible to simplify the technique and/or to reduce the amount of heat required for sintering together the silica particles in making the article, thereby materially lowering the cost of manufacturing the shaped articles. This is because of the particular combination of properties possessed by CS$_2$-Sil which is characterized by, among other characteristics, a sintering temperature that is materially below that of cristobalite silica, the melting point of which is 1710° C.

By using CS$_2$-Sil in making the shaped articles of the instant invention, one can produce sintered, substantially 100% silica compositions at temperatures of approximately 400° to 500° C. below the melting point of cristobalite silica. Depending upon variations in the conditions of production, the sintering temperature of the CS$_2$-Sil employed in practicing this invention is generally within the range of from about 1100° C. to about 1400° C., and more particularly from about 1200°–1250° C. to about 1325°–1375° C. Partial or substantially complete sintering of the silica particles may be effected within the ranges of sintering temperatures just mentioned. Sintering is preferably effected by heating the shaped (i.e., pre-shaped) mass of silica particles at a temperature within the range of from about 1250° C. to about 1350°–1375° C.

In accordance with one embodiment hereof, a highly transparent glass (or article thereof) is obtained by compacting and sintering under vacuum a homogeneous, high-content CS$_2$-Sil mixture containing small effective amounts of other ingredients, e.g. a process as disclosed in copending U.S. patent application Ser. No. 641,264, filed May 25, 1967, by Stephen W. Barber and William F. Nelson, and the copending parent applications thereof filed on Mar. 27, 1964, all of which are owned by the present assignee of the instant application and all of which are incorporated herein by reference.

Another advantage resulting from the production of shaped articles from CS$_2$-Sil is that they can be made so that a separate step of sealing or glazing the exposed surfaces is unnecessary. This is because at least the surfaces of the shaped structures are glassy in nature and, in effect, self-glazing. Still another advantage is that shapes can be formed at room temperature rather than shaping the article from the molten silica glass. Also, sintering times need only be a few minutes depending on the size and shape of the finished product.

Other advantages in the production of shaped articles of high silica content (e.g., 95–96% by weight and higher) from CS$_2$-Sil reside in the fact that the starting material is finely divided silica and not a glass which (by the prior practice of making such articles) had to be acid leached in order to form a high-silica structure. No acid leaching or pre-glass manufacture is required in making the shaped structures of this invention. In general, they can be produced at relatively low processing temperatures. For instance, by practicing this invention a 100% sintered silica article can be produced at a processing temperature of about 1370° C.

A further advantage in the use of CS$_2$-Sil as compared with, for example, fluffy silicas produced in an oxyhydrogen flame flows from the increased bulk density of CS$_2$-Sil. This higher density materially aids in pressing shaped structures preliminary to sintering. Finely divided silicas of the "clinging," fluffy type are much more difficult to compact than CS$_2$-Sil.

Additional information on CS$_2$-Sil

The subject-matter of invention of the aforementioned Best and Hughes copending application is based on their discovery that finely divided crude or "raw" (i.e., uncalcined or unrefined) oxides of metals and metalloids, specifically silica as an example, can be prepared by a method wherein, in addition to air and/or oxygen (as distinct from air), there is used a fuel or feed material which is a hydrogen-free compound containing sulfur bonded directly to carbon. Typical examples of such compounds are carbon disulfide, carbon selenide sulfide (CSeS) and carbon thiophosgene (CSCl$_2$). For economical and other reasons, preferably CS$_2$ is employed as the fuel.

In accordance with the Best et al. invention finely divided CS$_2$-Sil is produced by the direct oxidation of a silicon tetrahalide, specifically silicon tetrachloride, admixed (specifically premixed) with carbon disulfide vapor. A suitable inert gas, e.g., argon, helium or, preferably, nitrogen, may be employed as a carrier gas for this mixture. However, the carrier gas is not essential and may be omitted, for example, by employing a premix type of burner, the mixing chamber of which is heated above the boiling point of the feed materials; or by using a diffusion type of burner in which the burner itself is heated above the boiling point of the feed materials. Sufficient oxygen and/or air is supplied to completely oxidize the CS$_2$-SiCl$_4$ vapor mixture to, for example, sulfur dioxide and/or sulfur trioxide, carbon dioxide, silicon dioxide and chlorine.

The unobvious advantages obtained by using a compound containing sulfur bonded directly to carbon, specifically carbon disulfide, as fuel or feed-reactant material are set forth in the aforementioned Best et al. copending application. Primarily the CS$_2$ serves as a highly efficient internal heating source to elevate the silicon tetrachloride vapor to a temperature at which direct oxidation of SiCl$_4$ in the presence of oxygen can occur. An unobvious result from this use of CS$_2$ as fuel is the production of finely divided oxides, specifically silica, having properties that render CS$_2$-Sil different in kind and not merely in degree from silicas that are produced by other means, e.g., by hydrolysis and dehydration of SiCl$_4$ vapor in an oxyhydrogen flame.

In other words, the invention of Best et al. provides finely divided silica (among other oxides of metals and metalloids) that is unique in that it contains no detectable (if any) hydroxyl groups in its molecular structure when it is produced under optimum conditions of preparation wherein both the preparation-system and the feed materials are moisture-free (substantially moisture-free). This silica (both crude and calcined) is further characterized by having a sintering temperautre that is materially (e.g., from about 300°–600° C. or more) lower than the melting point of cristobalite silica. Thus, silica having little (if any) water content is produced by Best et al. by the direct oxidation of a silicon perhalide (specifically SiCl$_4$) vapor with excess oxidizing gas, e.g., O$_2$, in a high-temperature flame zone, and wherein the reaction zone is maintained in an ignited state by the introduction of CS$_2$ vapor admixed with SiCl$_4$ vapor.

As has been indicated hereinbefore, the finely divided crude silica that may be used as a starting material in making the articles of this invention contains oxides of sulfur and other by-products of the flame reaction. These by-products usually constitute from at least several percent (e.g., 4 or 5 percent) to 30 or 40 percent or more by weight of the crude silica depending, for example, upon the particular apparatus (including collection system), feed materials, operating parameters, etc., employed.

To remove the by-products (partly or substantially completely, as desired or as may be required) the crude silica may be calcined. Or, since some (if not all) of the by-products are water-soluble, the crude silica may be extracted with water to remove water-soluble by-products followed by heating to a calcination temperature or, if desired, merely to a drying temperature. Usually a minimum temperature of about 400° C. is required to drive off most of the volatile by-products associated with the finely divided crude silica, and temperatures as high as about 1000° C. may be employed as desired or as conditions may require. Up to several percent of volatile material is usually evolved merely by heating the finely divided crude silica at temperatures within the range of from about 100° C. to about 230° C. for periods ranging from 2 to 168 hours.

The preparation of $CS_2$–Sil can be controlled to produce a wide variety of sizes and ranges of sizes of particles, e.g., from about 0.01 micron to 0.2 micron and higher. Thus, calcined $CS_2$–Sil has been produced on a small scale showing a range between 0.02 and 0.12 micron with the majority, more particularly about 60%, ranging between 0.02 and 0.04 micron.

Calcined $CS_2$–Sil properly may be described as "ultrapure" silica. Analyses indicate that this silica shows nearly as low an impurity level of metals and metalloids as silica prepared by the oxyhydrogen process. B.E.T. surface areas of from about 70 to about 100 m.$^2$/g. are typical.

It may also be mentioned that $CS_2$–Sil (both crude and calcined) does not have the "clinging," fluffy characteristic of finely divided commercially available silica such as that which is understood to be produced from $SiCl_4$ in an oxyhydrogen flame, and which is hereafter (and also in the aforementioned Best et al. copending application) designated for purpose of brevity as C.A.–Sil.

At 50% relative humidity (R.H.) the moisture-absorptive properties of C.A.–Sil and calcined $CS_2$–Sil are very similar to each other. However, at 95% R.H. the C.A.–Sil absorbs 40% moisture while calcined $CS_2$–Sil absorbs less than 15%. This is strongly indicative of structural differences between the two silicas that are different in kind and not merely in degree.

For a consideration of other differences in properties between $CS_2$–Sil and C.A.–Sil reference is made to the aforementioned copending application of Best and Hughes.

When ultrafine silica is being produced in a flame from feed materials including $CS_2$ and a silicon perhalide, specifically $SiCl_4$, it may be stated that from theoretical considerations the products of complete combustion of $CS_2$, $SiCl_4$, air and/or oxygen should be $SiO_2$, $CO_2$, $SO_2$ (and/or $SO_3$), and $Cl_2$. On the other hand, when insufficient oxygen is present or operating conditions are such that incomplete combustion occurs, the oxidation products of a $CS_2$–$SiCl_4$–air and/or oxygen flame may be phosgene, thiophosgene, silicon sulfide and certain other compounds.

When, for example, $SiCl_4$ is the perhalide reactant employed in producing $CS_2$–Sil by the process described and claimed in the aforementioned Best et al. copending application, the flow conditions are preferably kept as close as possible to a ratio of 1 mole of silicon tetrachloride to at least 0.2 mole, e.g., from 0.2 to about 3 or 4 (preferably about 1 or 2) moles of $CS_2$, and to a proportion of $O_2$ in molar excess of that required theoretically to oxidize completely (substantially completely) all the $SiCl_4$ to $SiO_2$ and all the $CS_2$ to $CO_2$ and sulfur oxides, e.g., $SO_2$ and/or $SO_3$. Thus, when using 0.2 mole $CS_2$ per mole of $SiCl_4$, the molar amount of $O_2$ may be, for example, from about 2 to about 40 moles, and more particularly from about 3 to about 20 or 30 moles, per mole of $SiCl_4$. The amount of nitrogen, argon, helium or other diluent gas that is used as a carrier for the $CS_2$ and $SiCl_4$ is not critical from a reaction standpoint except that the relative amount should not be so great as to make difficult the maintenance of a suitable flame and the production of a satisfactory yield of $SiO_2$. Usually such inert gases as nitrogen are employed in a molar ratio of from 2 to 6 moles, more particularly from 2 to 3 or 4 moles, of such an inert gas per mole of total $SiCl_4$ plus $CS_2$. If and when air is used alone or admixed with nitrogen or other inert gas as a diluent gas for the $SiCl_4$ plus $CS_2$, then the amount of oxygen present in the air is normally taken into consideration in determining the aforementioned amount of $O_2$ required to effect complete combustion of the $SiCl_4$ to $SiO_2$ and the $CS_2$ to $CO_2$ and $SO_2$ (and/or $SO_3$).

Typical properties of $CS_2$–Sil (both crude and calcined) and of C.A.–Sil are summarized in Table I. The methods of determining these properties are either described in the aforementioned Best et al. copending application or an ASTM identifying designation of the procedure is there given.

TABLE I

| Property | Raw CS²-Sil | Calcined CS²-Sil | C.A.-Sil |
|---|---|---|---|
| Bulk density, avg. lb./cu.ft. | 2.728 | 2.902 | 2.128 |
| Specific gravity | 2.11 | 2.40 | 2.38 |
| pH, 0.1% suspension | 2.80 | 7.2 | 5.1 |
| Avg. particle size, μ | 0.056 | 0.042 | 0.015 |
| Calculated surface area, Meters/gm. | 42 | 56 | 193 |
| Physical state | Amorphous | Amorphous | Amorphous |
| 7-day moisture absorption: | | | |
| 50% R.H. | 8.75 | 1.45 | 2.06 |
| 95% R.H. | 82.10 | 14.65 | 38.70 |
| Percent silica to give a thin gel with— | | | |
| Kerosene | 10 | 10 | 8 |
| Toluene | 10 | 9 | 7.5 |
| 95% ethanol | 33⅓ | 20 | 10 |
| Water | 29 | 29 | 25 |
| Percent Silica to give a flat varnish with specular gloss of 16 | | 19 | 12 |

In Table II are summarized the results of analysis for metal and metalloid content (arc emission; parts per million) of samples of $CS_2$-Sil that can be used in producing the shaped articles of the instant invention. The percentages of ignition or calcination loss also are given. It will be noted that silica prepared utilizing "spectro" quality $CS_2$ and electronic grade $SiCl_4$ is markedly purer, that is, it has a lower content of metal and metalloid, than silica prepared utilizing "reagent" (i.e., analytical reagent) grade of $CS_2$ and electronic grade $SiCl_4$. The values reported in Table II are parts per million (p.p.m.) of metal or metalloid.

The calcination losses of 11.5 to 11.9% for the analyzed samples reported in Table II are due, in part, to loss of oxides of nitrogen as indicated by chemical analysis and also the color of the evolved gases and the odor. Volatile compounds such as chlorine, sulfur dioxide and/or sulfur trioxide are also by-products associated with the crude silicas used in practicing this invention, and are evolved upon calcination of the said silicas.

The finely divided crude silicas were prepared by the direct oxidation of $SiCl_4$ vapor premixed with $CS_2$ using apparatus which is essentially the same as that illustrated in FIGS. 1 and 2 of the drawing of the aforesaid Best et al. copending application and following the procedure described in the said application with reference to said FIGS. 1 and 2 of the drawing. Nitrogen was employed as a diluent or carrier gas for the mixture of $SiCl_4$ and $CS_2$ vaporous mixture. The amount of oxygen employed was in large excess of the stoichiometric amount required for the complete oxidation of the said vaporous mixture. The preparation-system and the feed materials were moisture-free (substantially moisture-free).

Data showing the operating parameters that were used in the preparation of the crude silicas, which were ignited, analyzed and the results summarized in the aforesaid Table II, are given in Table III that follows immediately after Table II.

TABLE II
[Summary of analysis of silica samples for metal and metalloid content (p.p.m.)]

| Sample of Run No. | Al | Mg | Cu | Zr | Na | Ti | Ba | Mn | Fe | Ca | Ni | Cr | Zn | Pb | Ignition Loss (percent) |
|---|---|---|---|---|---|---|---|---|---|---|---|---|---|---|---|
| E-23 [1] | 0.5 | <0.4 | 0.4 | <0.4 | <10 | <0.4 | <0.4 | <2 | 3 | <2 | <1 | <1 | <5 | 2-20 | 11.9 |
| E-26 [1] | 0.3 | <0.4 | 0.5 | <0.4 | <10 | <0.4 | <0.4 | <2 | 0.8 | <2 | <1 | <1 | 4 | 2-20 | 11.5 |
| E-27 [2] | 82 | 5 | 0.4 | 0.6 | <100 | 5 | 2 | <2 | 7 | <10 | 0.8 | 0.8 | 3 | 2-20 | 11.7 |

[1] Spectro quality $CS_2$, electronic grade $SiCl_4$. [2] Reagent grade $CS_2$, electronic grade $SiCl_4$.
Surface area: B.E.T. unfired, 87 m.²/g. fired, 1,000° C., 73 m.²/g.

TABLE III

| Run No. | $SiCl_4$, ml. | $SiCl_4$, moles | $CS_2$, ml. | $CS_2$, moles | $N_2$, c.f.h. | $N_2$, moles | $O_2$, c.f.h. | $O_2$, moles | Time, min. | Crude silica, g. |
|---|---|---|---|---|---|---|---|---|---|---|
| E-23 | 47.5 | 0.41 | 52.5 | 0.87 | 1.0 | 2.21 | 10 | 11.1 | 105 | 8.7 |
| E-26 | 47.5 | 0.41 | 52.5 | 0.87 | 1.0 | 2.63 | 10 | 13.2 | 125 | 13.8 |
| E-27 | 35.0 | 0.30 | 40.0 | 0.66 | 1.0 | 2.63 | 10 | 13.2 | 125 | 8.0 |

Production of articles of the invention

As has been indicated hereinbefore, there is provided by the present invention articles of manufacture comprising a shaped, solid, sintered mass of sinterable, particulate material comprised mainly or preponderantly (i.e., more than 90% up to and including substantially 100%), or consisting essentially, of finely divided $CS_2$-Sil, i.e., silica having in its crude form the characteristics of silica that has been produced by direct oxidation in a flame of a silicon perhalide, preferably silicon tetrachloride. However, it is to be understood that the use of other silicon perhalides, especially the perbromide and of lesser interest the periodide, are not precluded. The aforesaid flame results from the combustion of non-water-forming combustible gases. The crude silica is characterized by having volatile by-products associated therewith including those resulting from the utilization of carbon disulfide in the aforementioned flame. The crude silica is additionally characterized by having a sintering temperature within the range of from about 1100° C. up to a temperature materially below the melting point of 1710° C. of cristobalite silica, e.g., about 1400° C., and usually below 1400° C.

In carrying out the method features of this invention one may first shape the crude or raw finely divided $CS_2$-Sil, and then heat the resulting shaped material at a temperature and for a period of time sufficient to sinter the sinterable, particulate material into a shaped, sintered solid (at a temperature below its melting point) mass of a silica-containing composition. Then the crude $CS_2$-Sil is used as a starting material, then volatile by-products associated with the crude silica are evolved during the process of heating the $CS_2$-Sil to a sintering temperature. Heating to effect sintering is accompanied by shrinkage of the shaped article due to fusion of the particles, and an allowance must be made for this shrinkage in making a shaped article of a predetermined final size by this technique.

In order to minimize the outgassing problem encountered when sintering a shaped mass comprised or consisting essentially of $CS_2$-Sil, the crude finely divided silicon may be initially calcined at a temperature and for a time sufficient to remove as much as may be desired of volatile by-products associated with the said silica by reason of its method of manufacture, but insufficient to sinter the silica into a solid mass such that it loses its particulate form. Temperatures and periods of time that may be used for removing volatile by-products are tabulated below. The samples were heated in 25 x 59 mm. weighing bottles, using a sample size of 0.43±0.03 g. In all but one instance wherein the time of heating was 168 hours at 230° C., the heating period was terminated after 72 hours of heating. Temperatures of calcination up to a point just below the temperature of incipient sintering may be used in removing volatile by-products, for example (as previously has been mentioned) up to about 1000° C.

TABLE IV.—WEIGHT LOSSES OF CRUDE SILICA UNDER VARIOUS CALCINING CONDITIONS

| Time, hrs. | Percent wt. loss | | | |
|---|---|---|---|---|
| | 100° C. | 230° C. | 400° C. | 480° C. |
| 2 | 1.8 | | 3.3 | 10.3 |
| 4 | 2.5 | 3.0 | 4.7 | 12.0 |
| 8 | 2.7 | 3.1 | 6.2 | 13.0 |
| 16 | 3.1 | 3.3 | 10.1 | 13.5 |
| 24 | 3.2 | 3.4 | 11.0 | 13.5 |
| 48 | 3.2 | 3.5 | 12.0 | 13.6 |
| 72 | 3.2 | 3.5 | 12.1 | 13.6 |
| 168 | | 3.6 | | |

In making the shaped articles of this invention it is usually desirable to remove gases, especially occluded air, from the finely divided crude or calcined $CS_2$-Sil prior to molding. In commercial operations this is readily done by means of conventional equipment presently available for removing air from bulky, finely divided, organic and inorganic solids such as flour and the like. On a laboratory scale such compacting (i.e., reduction in volume) of the finely divided $CS_2$-Sil, e.g., to one-fifth or less of its original volume, can be effected by kneading it in a suitable bag such as a polyethylene bag.

From the foregoing description it will be seen that the present invention provides a method which includes the steps of (I) calcining finely divided crude $CS_2$-Sil to remove volatile by-products therefrom as previously has been described;

(II) forming to a desired shape the resulting sinterable, particulate material comprised or consisting essentially of finely divided $CS_2$-Sil; and (III) heating the resulting shaped article at a temperature and for a period of time sufficient to sinter the said sinterable, particulate material into a shaped, solid, sintered article comprised or consisting essentially of $CS_2$-Sil.

Step I may precede Step II or, as desired or as conditions may require, Step I may be included in Step III.

Any suitable means may be employed in shaping or forming the sinterable, particulate material referred to in Step II. For example, the finely divided $CS_2$-Sil may be dry pressed or isostatically pressed to the desired shape. In shaping the article isostatically i.e. by hydrostatic pressing, the pressure is applied uniformly from all sides, e.g., under an oil or other fluid pressure as in the manufacture of spark plugs.

The material of construction of the mold is, for example, natural or synthetic rubber or other elastomeric material when isostatic pressure is employed. When dry pressing is used the mold may be made of steel such as stainless steel or other alloys of iron, or of other metals or alloys that are castable or machinable, have a high abrasion resistance and a physical strength sufficient to withstand the molding pressure.

The molding pressure may range, for example, from about 100 to about 100,000 p.s.i.g.

The temperature of molding (i.e., pressing to shape) may range from ambient temperature to 100° C. or higher depending upon whether or not crude or calcined $CS_2$-Sil is being molded. In the case of crude $CS_2$-Sil containing volatile by-products, molding at temperatures ranging from 100° C. up to about 500°–600° C. may be effected in metal molds capable of withstanding such temperatures and which are provided with vents for the removal of by-product gases during molding. Such temperatures also may be used in molding calcined $CS_2$-Sil but ordinarily no particular advantages accrue therefrom. Usually both crude and calcined $CS_2$-Sil are molded at ambient temperature (about 20°–30° C.).

Hot pressing in a mold of graphite or other heat-resistant material also may be effected at temperatures sufficiently high to effect sintering of the finely divided silica in the mold.

The shaped article is removed from the mold and dried, if necessary, prior to firing. Drying at 100° C. may be employed to remove any water that may have been added as a temporary binder and/or followed by heating at a higher temperature such as 500°–600° C., to remove occluded gases and/or any organic binder, e.g., polyvinyl alcohol, that may have been used to assist in shaping the article.

The shaped or molded article comprised mainly (e.g., at least 90%, and preferably at least about 95 or 96% by weight), or consisting essentially, of $CS_2$-Sil is then fired to form a shaped, solid, sintered mass at a temperature and for a period of time such as have been mentioned hereinbefore. This may be done, for example, by heating the shaped article to and at a temperature within the range of, for instance, from about 1100° C. to about 1400° C. for a period of time sufficient to sinter the sinterable, particulate $CS_2$-Sil into a shaped solid, sintered mass comprised or consisting essentially of silica. The article to be sintered is preferably not introduced into a furnace or heating zone at the sintering temperature unless it has been first preheated to remove occluded gases. Otherwise, the occluded gases may be driven off with an explosive effect and distort the shaped article.

The shaped article should not be held at the sintering temperature for a period that would cause excessive devitrification, e.g., for more than about one hour.

Cooling of the fired structure is not critical since the fused silica article has good thermal resistance.

Preferably sintering is effected under vacuum, e.g., a vacuum corresponding to from 1 to 0.001 mm. Hg. By sintering under vacuum shaped articles of improved clarity are generally obtained.

The properties of a substantially 100% sintered $CS_2$-Sil shaped article of this invention may be modified by adding to the starting $CS_2$-Sil minor (less than 50% by weight) amounts of modifying components, more particularly inorganic oxides or oxide-forming ingredients. Preferably only a small or relatively small amount of modifying component is employed, e.g., up to about 4 or 5 weight percent or, in certain particular cases, up to about 10 weight percent. Examples of such modifying components are the oxides or oxide-forming compounds (e.g., oxides, carbonates, bicarbonates, hydroxides, etc.) of aluminum, zirconium, titanium, hafnium, beryllium, tungsten, boron, germanium, calcium, strontium, barium, magnesium, sodium, potassium, lithium, tin, the manganese, zinc, terbium, lanthanum and other rare-earth metals, and of other elements commonly employed as major or minor components of glasses or glass-like compositions. Such modifier or modifiers may be incorporated with the finely divided $CS_2$-Sil prior to shaping by any suitable technique, e.g., by dry blending, or by adding the modifier(s) in the form of a solution to the dry starting $CS_2$-Sil, followed by thorough admixing to obtain a homogeneous (substantially homogeneous) composition. $CS_2$-Sil is eminently suitable for use, in place of the silica heretofore used, in making shaped articles of the "Vycor" type and which are thermal-resistant borosilicates; as well as in making other shaped articles of the general kind now commercially available and which have a high silica content.

The shaped articles of this invention have other properties, in addition to those previously mentioned, that are unusual and unobvious in a produce of this general class, and which increase their field of utility. For instance, they permit a high degree of infrared light transmission. Also, the shaped articles of this invention have an unusually high degree of thermal shock resistance. For example, one can heat a shaped, sintered article of the invention to 1200° C., immediately drop it in tap water (temperature of about 15° C.), and the article does not craze or shatter in any way.

The reason for the low sintering temperature of $CS_2$-Sil as compared with other silicas, of which property advantage is taken in producing the shaped articles of this invention, cannot be explained with certainty. One possible explanation is that it may be due to absorbed gases on the silica surfaces that may act as a flux, or metal or metalloid sulfates also may be present and serve as a fluxing agent.

Evidence of the presence of adsorbed gases is shown by the fact that oxides of nitrogen, for example, were noted upon analyzing gases that were evolved upon heating $CS_2$-Sil to 500° C.

There is also the possibility that chlorine (a by-product of the reaction when the silicon perhalide is silicon tetrachloride) may be bonded to the $SiO_2$ chain in such a way that the melting point of the silica is lowered. Or, some of the oxygen in the structure may be replaced by the larger and more readily polarizable sulfur, and this may account for the lower sintering temperature of the silica product. Or, in some other unknown way, the gaseous by-products of the reaction may be physically associated or chemically bound with the silica so that its fusion or sintering point is materially lowered.

In order that those skilled in the art may better understand how the present invention can be carried into effect, the following examples are given by way of illustration and not by way of limitation.

EXAMPLE 1

This example summarizes the results obtained when three different samples of $CS_2$-Sil are vacuum-fired at 1750° C. and one of the three (sample E–14) is sintered at 1315° C. Fusion of three samples at 1750° C. is carried out in order to obtain clear samples for optical examination, e.g., adsorption and transmission spectra.

The procedure is as follows:

Samples of crude $CS_2$-Sil are pressed in a ½-inch diameter steel die into cylinders about 2 inches long under about 100 p.s.i.g. pressure. About 2 ml. water is added to 10 g. of the silica to improve compaction. The cylinders are dried at 100° C. for approximately 30 minutes and degassed by heating at 500° C. for 1 hour to prevent the rapid evolution of gases at the sintering temperature. Three of the samples are then sintered at 1100° C. for about 30 minutes. (In the case of sample E–14 sintering is done at 1315° C. and not processed further.) The cylinders shrink about 40% by this sintering step, but there is little vitrification. The samples sintered at 1100° C. somewhat resemble chalk at this point. Sample E–14 (sintered at 1315° C.) is somewhat vitreous.

The 1100° C.-sintered cylinders are placed in fused silica tubes, and a vacuum of about 1 mm. of Hg is established with a mechanical vacuum pump connected to the silica tubing. This vacuum is maintained as the samples are lowered through a 1750° C. furnace at about 1 inch per minute. After heating the entire length at this higher temperature, the sample cylinders are quickly withdrawn, and cooled in ambient air. The cooled samples are clear. The results are summarized in Table V.

TABLE V

| Sample | Vacuum-sintering or fusion Temperature, °C. | Thickness (in.) | U.V. cutoff (mμ) (A=1) | Water (percent) |
|---|---|---|---|---|
| E-12 | 1,750 | 0.192 | <185 | 0.0078 |
| E-13 | 1,750 | 0.170 | 195 | 0.0135 |
| E-14 | 1,750 | 0.195 | <185 | 0.0129 |
| E-14 | 1,315 | 0.080 | 200 | 0.0115 |

When $CS_2$-Sil is heated slightly above 1100° C., vitrification of the silica is noted; whereas with C.A.-Sil no vitrification of the silica is observed until the temperature exceeds 1400° C. Shaped articles, e.g., cylinders, of vitreous, translucent $CS_2$-Sil, can be prepared merely by sintering.

The preparation of these samples of $CS_2$-Sil including the operating conditions employed are given in Example 2, and more particularly in Table IV which is a part of said example, of the aforementioned Best et al. copending application.

EXAMPLE 2

$CS_2$-Sil, previously calcined at about 500° C. to remove volatile matter, is reduced to about ½ of its volume by kneading in a polyethylene bag of larger volume. To the kneaded silica is added 20% of water based on the weight of the silica. The moistened silica is placed in a rubber mold in the form of a small sparkplug insulator. The loaded rubber mold is immersed in a hydrostatic fluid, e.g., ethylene glycol, the chamber is sealed, and the article is isostatically pressed at 10,000 p.s.i. After removing the article from the press, it is dried at 100° C., and then fired at 1315° C. for about 30 minutes to obtain a fused or vitreous silica insulator having good thermal shock resistance and high electrical resistivity.

EXAMPLE 3

A portion of crude $SC_2$-Sil sample No. E-14 of Example 1 is pressed to form a shaped article, dried at 100° C. and degassed at 500°C. as described in Example 1. It is then sintered in air at atmospheric pressure for 30 minutes at 1315° C., yielding a translucent, vitreous silica article.

EXAMPLE 4

About 40 grams (approximately one liter) of crude $CS_2$-Sil is placed in a polyethylene bag of larger volume. By kneading the plastic bag containing the silica, the silica volume is reduced to about ⅓ of its original volume. Its volume can be further reduced, if desired, by adding water or other binder, e.g., polyvinyl alcohol, and kneading for an additional period of time.

The crude silica of reduced volume is then shaped, dried, degassed, and sintered both (a) under vacuum as described in Example 1 and (b) in air as set forth under Example 3.

EXAMPLE 5

Crude $CS_2$-Sil is pressed into a shaped article as described in Example 1. It is outgassed at 500° C. to prevent evolved gasses from disrupting the shaped article when it is fired. The outgassed, shaped structure is placed in a tube furnace at about 1000° C. A mechanical vacuum pump is connected to the furnace tube and, after a vacuum of about 100 microns has been established, the temperature is raised to 1370°. After 30 minutes at 1370° C., the samples are vitreous and are clearer than samples sintered at atmospheric pressure.

EXAMPLE 6

This example illustrates the preparation of shape $CS_2$-Sil articles modified with a minor amount of a modifying inorganic component.

(A) Nine and six-tenths (9.6) grams of crude $CS_2$-Sil is mixed into a slurry with 100 ml. of water. Fourteen and seven-tenths (14.7) ml. of 10% aluminum nitrate solution is added to the slurry and thoroughly mixed therewith. One ml. of concentrated reagent grade ammonium hydroxide is added to the slurry to precipitate the aluminum as the hydroxide. The slurry is then dried at 100° C., reground to a powder, pressed into a shaped article as described in Example 1, and then outgassed and sintered as set forth in Example 5. The shaped, sintered article contains about 96% $SiO_2$ and about 4% $Al_2O_3$.

(B) Same as in the (A) portion of this example with the exception that 0.71 g. of boric acid, $H_3BO_3$, dissolved in 15 ml. water is employed instead of 14.7 ml. of a 10% solution of aluminum nitrate. The shaped, sintered article contains about 96% $SiO_2$ and about 4% $B_2O_3$.

I claim:

1. A process for making a high silica-content transparent glass article of manufacture, said article being nonporus, chemically inert and resistant to thermal shock, which comprises:

(a) forming to a desired shape sinterable, particulate material consisting essentially of at least 90% by weight of finely divided, essentially hydroxyl-free, amorphous silica and from 0 to 10% by weight of an inorganic modifier therefrom selected from the group consisting of oxide of aluminum, zirconium, titanium, hafnium, beryllium, tungsten, boron, germanium, calcium, strontium, barium, magnesium, sodium, potassium, lithium, tin, manganese, zinc, and the rare-earth metals, and oxide-forming compounds of the aforementioned elements, said freely divided silica being produced by direct oxidation of a silicon perhalide in a flame, said flame resulting from the combustion of a non-water-forming combustible gas consisting essentially of carbon disulfide.

said finely divided silica having the property of absorbing less than 15% by weight moisture at 95% relative humidity, said finely divided silica having a particle size of from about 0.01 to 0.2 micron with at least about 60 percent of said particles being within the range of 0.02 to 0.04 micron.

(b) and heating the resulting shaped article at a sintering temperature within the range of from about 1100° C. to about 1400° C. or a period of time sufficient to form a sintered product.

2. The product made in accordance with the method defined in claim 1.

References Cited

UNITED STATES PATENTS

| 2,268,589 | 1/1942 | Heany | 65—18 XR |
| 3,116,137 | 12/1963 | Vasilos et al. | 65—18 XR |
| 3,151,964 | 10/1964 | North | 65—18 |
| 3,261,676 | 7/1966 | Morelock | 65—18 |
| 3,334,982 | 8/1967 | Mattmuller | 65—32 XR |
| 3,378,431 | 4/1968 | Smith et al. | 65—18 XR |

S. LEON BASHORE, Primary Examiner

FRANK W. MIGA, Assistant Examiner

U.S. Cl. X.R.

65—32, 60